United States Patent [19]

Hodgson

[11] Patent Number: 4,557,861
[45] Date of Patent: Dec. 10, 1985

[54] NUCLEAR FUEL CARTRIDGE, AND A METHOD OF PREPARING THE CARTRIDGE FOR THE EXTRACTION OF NUCLEAR MATERIAL THEREFROM

[75] Inventor: Thomas D. Hodgson, Abingdon, England

[73] Assignee: United Kingdom Atomic Energy Authority, London, England

[21] Appl. No.: 355,182

[22] Filed: Mar. 5, 1982

[30] Foreign Application Priority Data

Mar. 13, 1981 [GB] United Kingdom ................ 8108042

[51] Int. Cl.$^4$ ........................ G21C 19/44; G21C 3/18
[52] U.S. Cl. .................................... 252/627; 376/409;
376/420; 376/455; 376/901
[58] Field of Search ............... 376/311, 412, 426, 455, 376/901, 409, 420; 423/4, 20; 422/159, 255, 903; 137/251, 253; 29/400 N; 252/627

[56] References Cited

U.S. PATENT DOCUMENTS

| 60,648 | 3/1881 | Hodgson et al. | 376/455 |
|---|---|---|---|
| 3,034,868 | 5/1962 | Erickson | 426/4 |
| 3,125,493 | 3/1964 | D'Amore | 376/426 |
| 3,184,392 | 5/1965 | Blake | 376/426 |
| 3,192,122 | 6/1965 | Kelman et al. | 376/426 |
| 3,580,809 | 5/1971 | Williams et al. | 376/412 |
| 3,807,018 | 4/1974 | Ehrman et al. | 29/400 N |
| 3,813,464 | 5/1974 | Ayers | 423/20 |
| 3,831,248 | 8/1974 | Duncan et al. | 29/400 N |
| 4,273,616 | 6/1981 | Andrews | 376/420 |
| 4,292,127 | 9/1981 | Hartley et al. | 376/430 |
| 4,294,805 | 10/1981 | Hodgson et al. | 426/4 |

OTHER PUBLICATIONS

Nero, Jr., Anthony V., *A Guidebook to Nuclear Reactors*, U. CA Press, Ltd., London, GB, 1979, p. 165.

Primary Examiner—Deborah L. Kyle
Assistant Examiner—Richard W. Wendtland
Attorney, Agent, or Firm—Larson and Taylor

[57] ABSTRACT

A nuclear fuel cartridge comprises a sheath, and nuclear material inside the sheath. A continuous liquid permeable passageway extends from one end of the nuclear material to the other, and an annular end member is disposed at each end of the nuclear material. Inner spacing members also of annular form may be disposed in intermediate positions along the sheath between portions of the nuclear material.

18 Claims, 3 Drawing Figures

NUCLEAR FUEL CARTRIDGE, AND A METHOD OF PREPARING THE CARTRIDGE FOR THE EXTRACTION OF NUCLEAR MATERIAL THEREFROM

This invention relates to a nuclear fuel cartridge, and more particularly but not exclusively to a nuclear fuel cartridge comprising nuclear fuel and nuclear breeder material in a sheath or cladding.

A nuclear fuel cartridge, which might also be termed a nuclear fuel element or nuclear fuel pin, is generally of elongate form and usually comprises nuclear fuel material in a sheath but might also include a nuclear breeder material, e.g. depleted uranium. The sheath might comprise stainless steel or an alloy of zirconium, and serves to retain fission products released during irradiation of the nuclear fuel material as well as improving heat transfer between the nuclear material(s) and a reactor coolant arranged to flow about the cartridge.

After irradiation in a nuclear reactor, an irradiated cartridge is subsequently treated in a nuclear reprocessing plant to extract from the cartridge, the nuclear materials and fission products. Conventional practice in the nuclear reprocessing industry is for the cartridge to be cut into relatively short lengths of from about 25 mm to 80 mm long to expose the nuclear material at each end of the short lengths to a dissolvent into which the short lengths are placed, the sheath portion of the short lengths being insoluble in the dissolvent.

However, in British patent application No. 8108043, there is described a method of dissolving nuclear material from a relatively long portion cut from a nuclear fuel cartridge, the long portion having a liquid permeable passageway extending from one end to the other end of the long portion. The present invention, therefore, is concerned with providing a nuclear fuel cartridge adapted to be reprocessed by the method of the aforementioned British patent application No. 8108043.

According to the present invention, there is provided a nuclear fuel cartridge comprising a sheath, nuclear material in the sheath, there being a liquid permeable passageway defined at least in part by the nuclear material and extending from one end of the nuclear material to the other end thereof, and end members one at each end of the nuclear material for providing or being adapted to provide access for a dissolvent into the passageway during reprocessing of the cartridge.

Preferably, each end member has a liquid permeable passageway at least partially therethrough and communicable with the passageway defined by the nuclear material. Alternatively, the end members may comprise a material totally dissolvable in the or a dissolvent, or comprise a frangible material.

The nuclear material may be of annular form so as to define a said passageway therethrough, or the passageway may be defined by at least one off-centre hole through the nuclear material or by at least one groove at the periphery of the nuclear material. Alternatively, the or some of the nuclear material may comprise a liquid permeable porous body or a plurality of said bodies, the interstices in the body or bodies providing the said passageway.

In one form of nuclear fuel cartridge according to the invention, the nuclear material comprises nuclear fuel material and nuclear breeder material disposed in axially displaced relationship along the sheath, for example the nuclear fuel material being located between the nuclear breeder material in the sheath.

Desirably, at least one inner spacing means is provided between sections or portions of the nuclear material, the inner spacing means providing, or being adapted to provide, a liquid permeable passageway communicable with the passageway of the nuclear material adjacent thereto. Alternatively, the inner spacing means may comprise a material totally dissolvable in the or a dissolvent, or comprise a frangible material.

The invention also includes a nuclear fuel cartridge comprising a sheath, and nuclear material in the sheath, the nuclear material comprising nuclear fuel material and nuclear breeder material disposed in axially displaced relationship along the sheath, there being a liquid permeable passageway defined at least in part by the nuclear fuel material and the nuclear breeder material and extending through the nuclear material to the outer ends thereof.

In a further aspect the invention provides a method of preparing the nuclear fuel cartridge of the invention for the extraction of the nuclear material therefrom, the method comprising cutting the cartridge at regions free of nuclear material but such as to expose the passageway or portions thereof, the passageway or the portions being open at each end for circulation therethrough of a dissolvent for the nuclear material.

The method of the invention may include, cutting transversely through the cartridge at a region of the sheath occupied by a said end member and, where appropriate may also include cutting transversely through the cartridge at a region of the sheath occupied by a said inner spacing means.

The fuel cartridge when prepared by the method of the invention may be reprocessed by the method of our afore-mentioned British patent application No. 8108043.

It will be apparent that performance of the method of the invention does not require the fuel cartridge to be cut by a cutting device at regions of the fuel cartridge occupied by nuclear material. Thus the load on the cutting device may be reduced and the spread of fines of the nuclear material during the cutting operation can be minimised.

It will be understood that the sheath might comprise a metal can, or might for example comprise a coating applied about the nuclear material.

The nuclear fuel cartridge of the invention has one application as a nuclear fuel pin for a nuclear fast reactor.

The invention will now be further described by way of example only with reference to the accompanying drawings in which.

Figure 1:
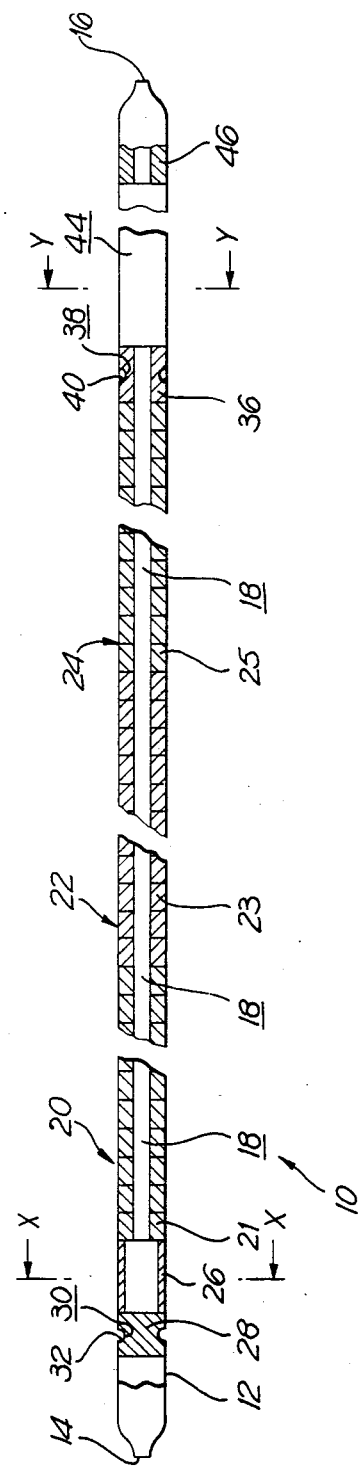
FIG. 1 shows generally in median section a side representation of a nuclear fuel cartridge.

Referring now to FIG. 1 a fuel cartridge 10 is shown and comprises a tubular stainless steel sheath 12, closed conventionally at each end 14, 16 respectively. Inside the sheath 12, three nuclear material portions 20, 22, 24 respectively each of annular form and defining a liquid permeable passageway 18 therethrough are located in abutting relationship, the portions 20 and 24 comprising a plurality of annular pellets 21, 25 respectively of nuclear breeder material (e.g. $U_{238}$ as $UO_2$), and the portion 22 comprising a plurality of annular pellets 23 of nuclear fuel material (e.g. essentially enriched uranium as $UO_2$, and plutonium as $PUO_2$ mixed in the ratio of about 75%/25%). An outer spacer 26 of stainless steel and of annular form is disposed at one end of the cartridge 10 adjacent at one end to the portion 20. At the other end of the outer spacer 26, a solid retainer 28 of stainless steel is disposed a relatively short distance from the end 14 of the sheath 12, the plug 28 having a circumferential groove 30 in which a swaged annular portion 32 of the sheath 12 locates to retain the plug 28. A platform 36 of stainless steel and of annular form is disposed adjacent to the portion 24, and has a circumferential groove 38 in which a swaged annular portion 40 of the sheath 12 locates to retain the platform 36. A plenum space 44 is defined between the platform 36 and the end 16 of the cartridge 10 to provide an expansion space for fission product gases and extends into an end portion 46 of the sheath 12 which is partly of annular form.

In use, the cartridge 10 in a nuclear fuel cluster (not shown) is placed upright in the core of a nuclear reactor (not shown) with the end 16 lowermost. When the cartridge 10 is subsequently removed from the reactor for reprocessing, the cartridge 10 is cut transversely on the line X—X at the region of the outer spacer 26 and on the line Y—Y at the region of the plenum space 44 to leave a cut length of the cartridge 10 in which the passageway 18 is exposed. The cut length may now be reprocessed by the method described in the afore-mentioned British patent application No. 8108043 so as to extract the nuclear material portions 20, 22, 24 from inside the sheath in a dissolver, for example as shown in FIG. 2 to which reference is now made.

Figure 2:
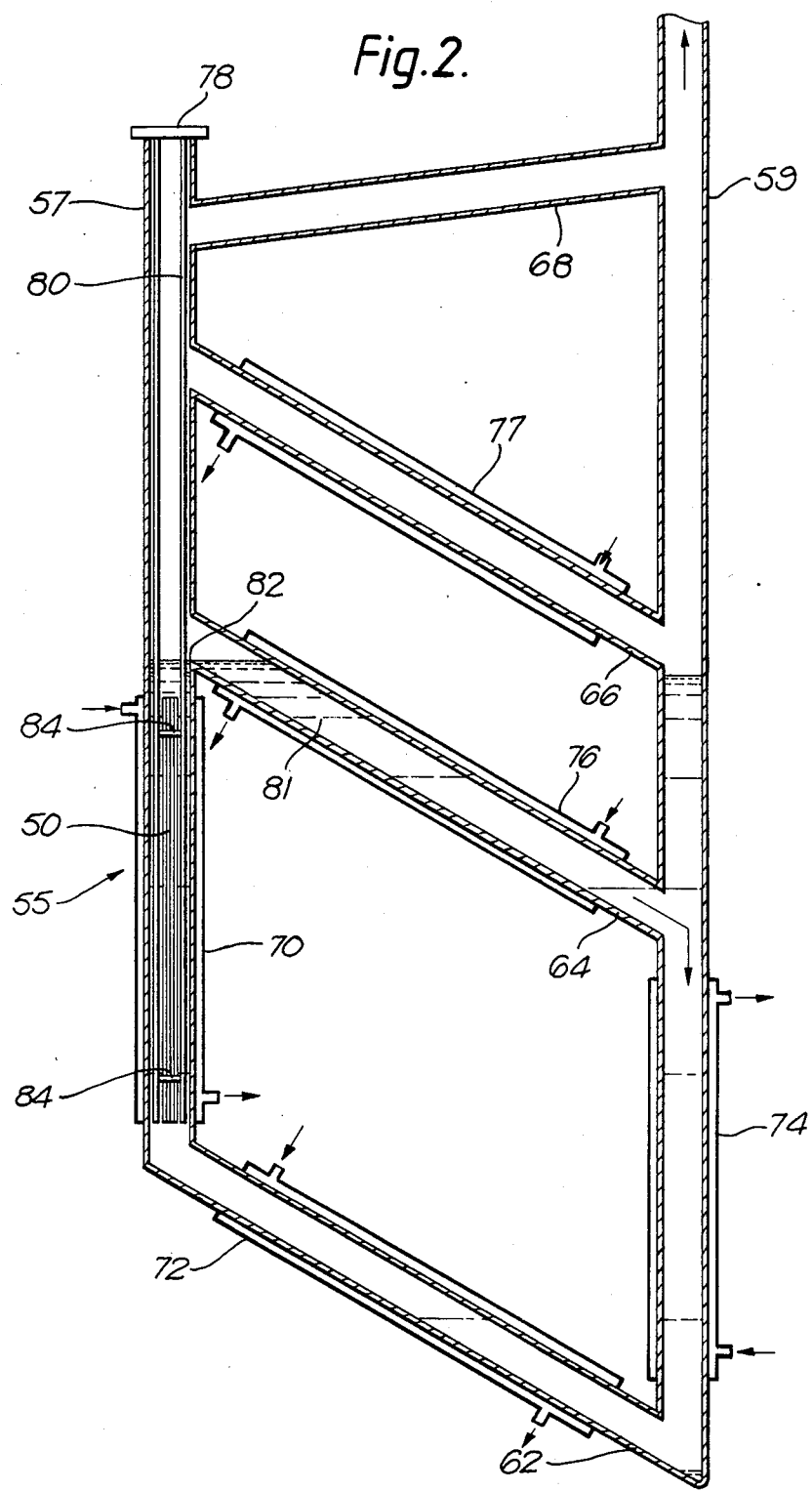
FIG. 2 shows in median section a side representation of a dissolver.

In FIG. 2, a dissolver 55 is shown which forms part of a nuclear fuel reprocessing plant (not shown). The dissolver 55 comprises two upright cylindrical vessels 57, 59 connected together by a base tube 62, by two recirculation tubes 64, 66 respectively, and by a vent tube 68, the base tube 62, and the recirculation tubes 64, 66 extending declivitously from the vessel 57, and the vent tube 68 extending acclivitously from the vessel 57. Between the base tube 62 and the recirculation tube 64, a jacket 70 is disposed about the vessel 57, and a jacket 74 for a cooling liquid disposed about the vessel 59, whilst a steam jacket 72 is disposed about the base tube 62 and respective jackets 76, 77 for a cooling liquid disposed about the recirculation tubes 64 and 66. A removable cap 78 at the top of the vessel 57 supports a frame 80 which extends in the vessel 57 to the base tube 62. The dissolver 55 contains nitric acid 81 to a junction 82 between the vessel 57 and the recirculation tube 64, and a plurality of cut lengths 50 of fuel cartridges 10 of FIG. 1 are attached to the frame 80 by clamp members 84 such that the upper ends of the cut lengths 50 are just below the level of the nitric acid 81. The upper end of the vessel 59 is connected to a condenser (not shown) and to an off-gas system (not shown) in the reprocessing plant.

In operation, nitric acid 81 (e.g. 8M) is maintained near boiling (80° C.+) by the steam jackets 70, 72 whilst cold water passing through the cooling jackets 74, 76 produces thermo-siphon circulation of the nitric acid 81. The nitric acid 81 enters the passageways 18 (not shown in FIG. 2) of the cut lengths 50 through the outer spacer 26 or the platform 36 thereof (not shown in FIG. 2) and reacts with the nuclear material in the cut lengths 50, gas mainly $NO_2$ and NO being generated. The gas produces an effect analagous to that of an air lift pump, since the gas mixes with the nitric acid 81 in the passageways 18 and results in the density of the mixture of the gas and the nitric acid 81 in the passageways 18 being less than that of the static head of the nitric acid 81 in the vessel 57 at the lower ends of the passageways 18. Thus fresh nitric acid 81 flows from the vessel 57 into the passageways 18, and the level of the mixture of the gas and the nitric acid 81 in the passageways 18 rises until the nitric acid 81 flows from the upper ends of the passageways 18 into the vessel 57. This circulation of the nitric acid 81 through the passageways 18 continues until the nuclear material in the cut lengths 50 has been dissolved, the saturated nitric acid 81 being removed from the dissolver 55 by conventional means, for example by use of a jet pump (not shown).

Figure 3:
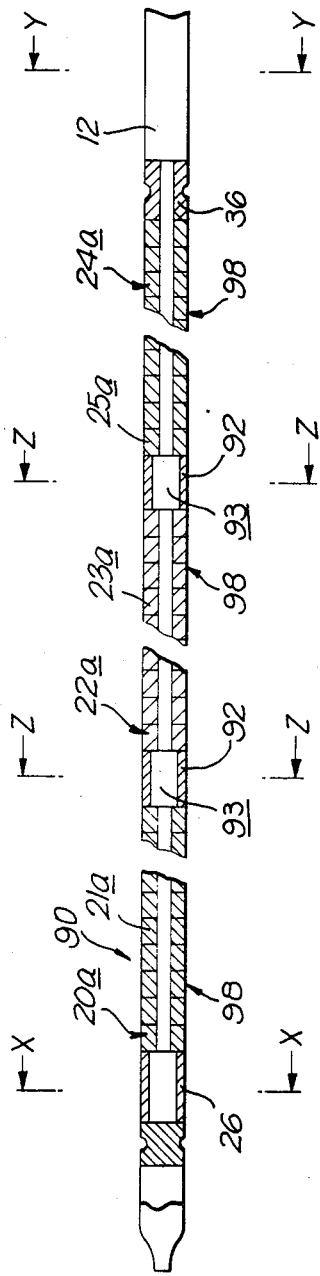
FIG. 3 shows generally in median section a modification of the nuclear fuel cartridge of FIG. 1.

The invention has been described in relation to a fuel cartridge arranged to be cut solely near the ends thereof, but when a fuel cartridge is to be cut into a plurality of portions (e.g. 1000 mm long) each containing nuclear material, the modified fuel cartridge of FIG. 3 may be used. Referring now to FIG. 3, part of a fuel cartridge 90 is shown which is similar in most respects to the fuel cartridge 10 of FIG. 1, but has stainless steel annular inner spacers 92 defining a liquid permeable passageway 93 therein and disposed between annular nuclear material portions 20a and 22a, and 22a and 24a respectively, the portions 20a and 24a comprising annular pellets 21a, 25a respectively comprising nuclear breeder material, and the portion 22a comprising annular pellets 23a comprising nuclear fuel material. In other respects the cartridge 90 is identical to the fuel cartridge 10 of FIG. 1.

When the fuel cartridge 90 of FIG. 3 is to be cut for reprocessing, the cartridge 90 may be cut transversely at the same regions on lines X—X and Y—Y as the cartridge 10 of FIG. 1, but additionally may be cut on lines Z—Z through regions of the cartridge 90 occupied by the inner spacers 92 to divide the cartridge 90 into a plurality of cut portions 98 which may then be placed in the dissolver 55 of FIG. 2 to extract the nuclear material therefrom. If desired, additional inner spacers 92 may be intercalated in the fuel cartridge of FIG. 3 to increase the number of regions through which transverse cuts may be made.

Although the invention has been described in relation to a single nuclear fuel cartridge of the invention being cut transversely for reprocessing, a plurality of the cartridges in parallel relationship in a nuclear fuel cluster or assembly may be cut transversely without the cartridges being removed from the cluster, and the portions cut from the cluster may then be placed in the dissolver of FIG. 2 to extract the nuclear material from each cut length of cartridge in the portions.

It will be appreciated that although in the above examples a fuel cartridge of the invention has been described containing nuclear breeder material and nuclear fuel material, the cartridges of FIG. 1 and FIG. 3 might be modified so as to comprise solely nuclear fuel material or nuclear breeder material, the outer spacer 26 and the inner spacers 92 serving the same function of enabling the fuel cartridge to be cut transversely to expose a liquid permeable passageway defined by the nuclear material therein but without having to cut through the nuclear material.

In the foregoing description of the invention, features of nuclear fuel cartridges known to those skilled in the art have been assumed without being recited, and are only described to the extent necessary for an understanding of the invention, similar observations applying to aspects of the dissolver 55 of FIG. 2.

The passageway 18 in the fuel cartridges 10, 90 is desirably at least 0.5 mm wide but narrower passageways may be provided (e.g. 0.1 mm) particularly when the dissolver 55 of FIG. 2 is also adapted to perform the invention described in British Patent Specification No. 2028293A (U.S. Pat. No. 4,294,805) and incorporated by reference herein, to initiate penetration of the nitric acid 81 into the passageway 18.

It is not necessary for the liquid permeable passageway to be parallel to the longitudinal axis of the fuel cartridge, and at least one such passageway may be provided through the nuclear fuel material and/or the nuclear breeder material by the interstices in a permeable porous body thereof, for example a body comprising vibro-compacted granules. The granules might be about 800 $\mu$m average size, and a permeable member, such as stainless steel mesh (not shown) resistant to the nitric acid, would be inserted in the bore of the outer spacer 26 and of the platform 36 during assembly of the cartridge 10, 90, to retain the granules in the sheath 12 during reprocessing of the nuclear fuel material until the granules dissolved in the nitric acid. Alternatively, a liquid permeable passageway may be defined by at least one gap between the nuclear material and the sheath of the nuclear fuel cartridge, for example a groove, or by at least one off-centre hole through the nuclear material.

It will be appreciated that a liquid permeable passageway may also be introduced in the aforesaid end members and/or inner spacing means by structural changes therein during irradiation in the core of a nuclear reactor, for example from the effect of thermal conditions in said core. Alternatively, the end members and/or inner spacing means may comprise relatively brittle or frangible material, a liquid permeable passageway subsequently being produced in the material after the fuel cartridge has been removed from the nuclear reactor, for example by crushing of the sheath in the region of the material.

Although the cartridge of the invention enables lengths (e.g. 300 mm to 1000 m) to be cut therefrom without having to cut through the nuclear material, the cartridge may also be cut transversely through the region of the nuclear material, for example when lengths of about 150 mm+are required. However, fewer cuts would be necessary to prepare the fuel cartridge for reprocessing than would be needed to cut a fuel cartridge into the afore-mentioned relatively short lengths of about 25 mm to 80 mm long and, therefore, fewer fines of the nuclear material and of the sheath should be produced.

I claim:

1. A method of extracting nuclear material from a nuclear fuel cartridge, said cartridge comprising a sheath and nuclear material in the sheath defining at least in part an axial passageway for liquid extending from one end to the other end of the nuclear material, said sheath including regions therein free of nuclear material at each end of the nuclear material for providing access for a dissolvent for the nuclear material into the passageway during reprocessing of the cartridge, said method comprising cutting the cartridge at the regions free of nuclear material such as to provide access to the passageway suitable to permit circulation therethrough of a dissolvent for the nuclear material, and circulating a dissolvent through said passageway to extract soluable nuclear material therefrom.

2. A method of extracting fuel from a nuclear fuel cartridge, said cartridge comprising a sheath and nuclear material in the sheath, the nuclear material comprising nuclear fuel material and nuclear breeder material disposed in axially displaced relationship along the sheath, the nuclear fuel material and the nuclear breeder material defining at least in part an axial passageway for liquid extending through the nuclear fuel material and the nuclear breeder material between the outer ends thereof, said sheath further including regions therein free of nuclear material adjacent said outer ends for providing access for liquid to said passageway, said method comprising cutting the cartridge at the regions free of nuclear material such as to provide access to the passageway suitable to permit circulation therethrough of a dissolvent for the nuclear material and circulating a dissolvent through said passageway to extract soluable nuclear material therefrom.

3. A method according to claim 1 wherein the said regions free of nuclear material are constituted by end members comprising a material dissolvable in the dissolvent so as to provide access into the passageway.

4. A method according to claim 1 further comprising at least one inner spacing means between portions of the nuclear material, the inner spacing means providing a portion of the liquid permeable passageway communicable with that portion of the passageway defined by the nuclear material adjacent thereto.

5. A method according to claim 4 wherein the inner spacing means is of annular form.

6. A method according to claim 4 wherein the inner spacing means comrpises a material dissolvable in the dissolvent so as to provide access into the passageway.

7. A method according to claim 4 wherein the nuclear material comprises vibro-compacted granules thereof, and permeable members cooperating with the end members and the inner spacing means to retain the granules in the sheath between the end members and the inner spacing means during reprocessing of the cartridge, the permeable members, the end members, and the inner spacing means, being resistant to the dissolvent.

8. A method according to claim 1, wherein the nuclear material comprises vibro-compacted granules thereof, and permeable members cooperating with the end members to retain the granules in the sheath between the end members during reprocessing of the cartridge, the permeable members and the end members being resistant to the dissolvent.

9. A method according to claim 1 wherein the nuclear material comprises nuclear fuel material.

10. A method according to claim 1 wherein the nuclear material comprises nuclear breeder material.

11. A method according to claim 1 wherein the nuclear material comprises nuclear fuel material and nuclear breeder material disposed in axially displaced relationship along the sheath.

12. A method according to claim 11 wherein the nuclear fuel material is located between nuclear breeder material.

13. A method according to claim 1 wherein the cartridges is one of a plurality thereof assembled together in parallel relationship to provide a nuclear fuel cluster.

14. A method according to claim 2 wherein said fuel cartridge is one of a plurality thereof assembled together in parallel relationship to provide a nuclear fuel cluster and wherein said method further comprises cutting each cartridge in the cluster to provide said access.

15. A method extracting nuclear material from a nuclear fuel cartridge, said cartridge comprising a sheath and nuclear material in the sheath, the nuclear material in the sheath defining at least in part a liquid permeable passageway extending from one end to the other end of the nuclear material, and end members one at each end of the nuclear material which include regions free of nuclear material that provide access for a dissolvent for the nuclear material into the passageway during reprocessing of the cartridge, said method comprising cutting the cartridge at regions free of nuclear material such as to provide access to the passageway suitable to permit circulation therethrough of a dissolvent suitable to permit the nuclear material and circulating a dissolvent through said passageway to extract soluable nuclear materials therefrom, said fuel cartridge being one of a plurality thereof assembled together in parallel relation to provide a nuclear fuel cluster, and said method further comprising cutting each cartridge in the cluster.

16. A method according to claim 15 wherein the nuclear material is of annular form so as to define said passageway therethrough.

17. A method according to claim 16 wherein the passageway is at least 0.5 mm diameter.

18. A method according to claim 15 wherein the passageway is at least 0.1 mm wide.

* * * * *